US009573808B2

(12) United States Patent
Jiang et al.

(10) Patent No.: US 9,573,808 B2
(45) Date of Patent: Feb. 21, 2017

(54) AQUEOUS SOLUTION AND METHOD FOR USE THEREOF

(71) Applicant: Schlumberger Technology Corporation, Sugar Land, TX (US)

(72) Inventors: Li Jiang, Katy, TX (US); Bruno Lecerf, Houston, TX (US); Timothy G. J. Jones, Cambridge (GB); Richard Hutchins, Sugar Land, TX (US); Murtaza Ziauddin, Katy, TX (US); Andrey Mirakyan, Katy, TX (US); Jian He, Sugar Land, TX (US); Chad Kraemer, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 476 days.

(21) Appl. No.: 13/955,394

(22) Filed: Jul. 31, 2013

(65) Prior Publication Data

US 2015/0037234 A1    Feb. 5, 2015

(51) Int. Cl.
*C01B 7/01* (2006.01)

(52) U.S. Cl.
CPC ..................... *C01B 7/01* (2013.01)

(58) Field of Classification Search
CPC ....................................................... C01B 7/01
USPC .................................................. 423/265, 481
See application file for complete search history.

(56) References Cited

U.S. PATENT DOCUMENTS

| | | |
|---|---|---|
| 556,669 A | 3/1896 | Frasch |
| 2,185,864 A | 1/1940 | Muskat et al. |
| 2,250,379 A | 7/1941 | Johnson |
| 2,250,474 A | 7/1941 | Eisenbrand et al. |
| 2,860,106 A | 11/1958 | Little et al. |
| 3,826,312 A | 7/1974 | Richardson et al. |
| 3,892,275 A | 7/1975 | Lybarger et al. |
| 3,920,566 A | 11/1975 | Richardson et al. |
| 3,920,591 A | 11/1975 | Jacobs et al. |
| 3,936,316 A | 2/1976 | Gulla |
| 3,953,340 A | 4/1976 | Templeton et al. |
| 3,953,352 A | 4/1976 | Mizutani et al. |
| 3,963,650 A | 6/1976 | Ogden |
| 4,094,957 A | 6/1978 | Sartori et al. |
| 4,116,664 A | 9/1978 | Jones |
| 4,151,098 A | 4/1979 | Dill et al. |
| 4,315,763 A | 2/1982 | Stoller et al. |
| 4,428,432 A | 1/1984 | Pabley |
| 4,466,893 A | 8/1984 | Dill |
| 4,487,265 A | 12/1984 | Watanabe |
| 4,567,946 A | 2/1986 | Watanabe |
| 4,648,456 A | 3/1987 | Lamb et al. |
| 4,673,522 A | 6/1987 | Young |
| 4,675,120 A | 6/1987 | Martucci |
| 4,753,746 A | 6/1988 | Mesmer et al. |
| 4,807,703 A | 2/1989 | Jennings, Jr. |
| 4,830,766 A | 5/1989 | Gallup et al. |
| 5,616,151 A | 4/1997 | Sargent et al. |
| 5,650,633 A | 7/1997 | Ahmed et al. |
| 5,672,279 A | 9/1997 | Sargent et al. |
| 5,708,107 A | 1/1998 | Ahmed et al. |
| 5,763,610 A | 6/1998 | Ahmed et al. |
| 5,789,610 A | 8/1998 | Bowen |
| 5,855,244 A | 1/1999 | Ahmed et al. |
| 5,883,210 A | 3/1999 | Ahmed et al. |
| 5,919,375 A | 7/1999 | Sargent et al. |
| 5,922,653 A | 7/1999 | Ahmed et al. |
| 6,051,670 A | 4/2000 | Ahmed et al. |
| 6,340,660 B1 | 1/2002 | Gastgaber |
| 6,365,121 B1 | 4/2002 | Wurmbauer |
| 6,425,947 B1 * | 7/2002 | Berlin ................. C09D 5/185 106/18.12 |
| 6,793,905 B1 | 9/2004 | Buttner et al. |
| 7,029,553 B1 | 4/2006 | Williams et al. |
| 7,357,879 B2 | 4/2008 | Takahashi et al. |
| 7,534,754 B2 | 5/2009 | Netherton |
| 7,547,665 B2 | 6/2009 | Welton et al. |
| 7,621,334 B2 | 11/2009 | Welton et al. |
| 7,658,805 B2 | 2/2010 | Netherton |
| 7,938,912 B1 | 5/2011 | MacDonald |
| 8,003,577 B2 * | 8/2011 | Li ........................ C09K 8/512 166/305.1 |
| 8,092,555 B2 | 1/2012 | Hertz et al. |
| 8,101,664 B2 | 1/2012 | Silvander |
| 8,163,092 B2 | 4/2012 | Baniel et al. |
| 8,163,102 B1 | 4/2012 | MacDonald |

(Continued)

FOREIGN PATENT DOCUMENTS

| | | |
|---|---|---|
| CN | 102828734 A | 12/2012 |
| CN | 103333673 A | 10/2013 |

(Continued)

OTHER PUBLICATIONS

Liu et al., "Acid Fracturing Technique for Carbonate Reservoirs Using Nitric Acid Powder", Canadian International Petroleum Conference, Paper 2003-007, Jun. 2003, 11 pages.
Gupta, "Interaction of urea with weak acids and water", The Journal of Physical Chemistry, vol. 91, No. 22, 1987, pp. 5826-5832.
International Search Report and Written Opinion issued in PCT/US2014/044239 on Oct. 16, 2014, 10 pages.
Scherrer, "On the combination of Urea with the Hydracids", Jan. 14, 1843, The Chemical Gazette vol. I, No. VI, pp. 141-145.
Examination Report issued in related AU application 2014227472 on Feb. 13, 2015, 8 pages.
Hayashi, et al., "Solubilities Studies of Basic Amino Acids", 1966, Agr. Biol. Chem., vol. 30, No. 4, pp. 378-384.

(Continued)

*Primary Examiner* — Ngoc-Yen Nguyen
(74) *Attorney, Agent, or Firm* — Andrea E. Tran

(57) ABSTRACT

An aqueous solution includes HCl present in an amount exceeding 37% by weight. The solution further includes a fixing agent that is urea and/or a urea derivative. The fixing agent is present in the solution in a molar ratio of between 0.25 and 2.0 of fixing agent to HCl, inclusive.

4 Claims, 1 Drawing Sheet

(56) References Cited

U.S. PATENT DOCUMENTS

| | | |
|---|---|---|
| 8,269,037 B2 | 9/2012 | Vorberg et al. |
| 8,430,971 B1 | 4/2013 | MacDonald |
| 2007/0289640 A1 | 12/2007 | Kirchner et al. |
| 2010/0282236 A1 | 11/2010 | Xiao et al. |
| 2011/0124533 A1* | 5/2011 | Notte .................. C02F 5/12 507/235 |
| 2012/0138299 A1* | 6/2012 | Joseph ................ C04B 28/06 166/293 |
| 2013/0261032 A1 | 10/2013 | Ladva et al. |
| 2014/0041690 A1* | 2/2014 | MacDonald, II ..... B01F 5/0415 134/25.3 |
| 2014/0374107 A1 | 12/2014 | Reyes et al. |
| 2015/0114647 A1 | 4/2015 | Jiang et al. |
| 2015/0344771 A1 | 12/2015 | Li et al. |

FOREIGN PATENT DOCUMENTS

| | | | |
|---|---|---|---|
| CN | 103387518 A | 11/2013 | |
| EP | 0123066 B1 | 10/1988 | |
| EP | 1136529 A1 | 9/2001 | |
| EP | 1886976 A1 | 2/2008 | |
| HU | 195241 B | 6/1989 | |
| IL | WO 2013140402 A1 * | 9/2013 | ............ A01N 25/02 |
| WO | 2009086954 A1 | 7/2009 | |
| WO | 2012075091 A2 | 6/2012 | |
| WO | WO2012076841 A1 | 6/2012 | |
| WO | 2013064823 A1 | 5/2013 | |

OTHER PUBLICATIONS

European Search Report issued in related EP application 14187120.2 on Apr. 29, 2015, 3 pages.

Second Examination Report issued in related AU application 2014227472 on Sep. 10, 2015, 4 pages.

Extended European Search Report issued in related EP application 14187120.2 on Nov. 12, 2015, 3 pages.

Notice of Acceptance issued in related AU Application No. 2014227472 mailed Feb. 10, 2016 (3 pages).

Non-Final Rejection issued in U.S. Appl. No. 14/062,291 on Dec. 8, 2016; 9 pages.

* cited by examiner

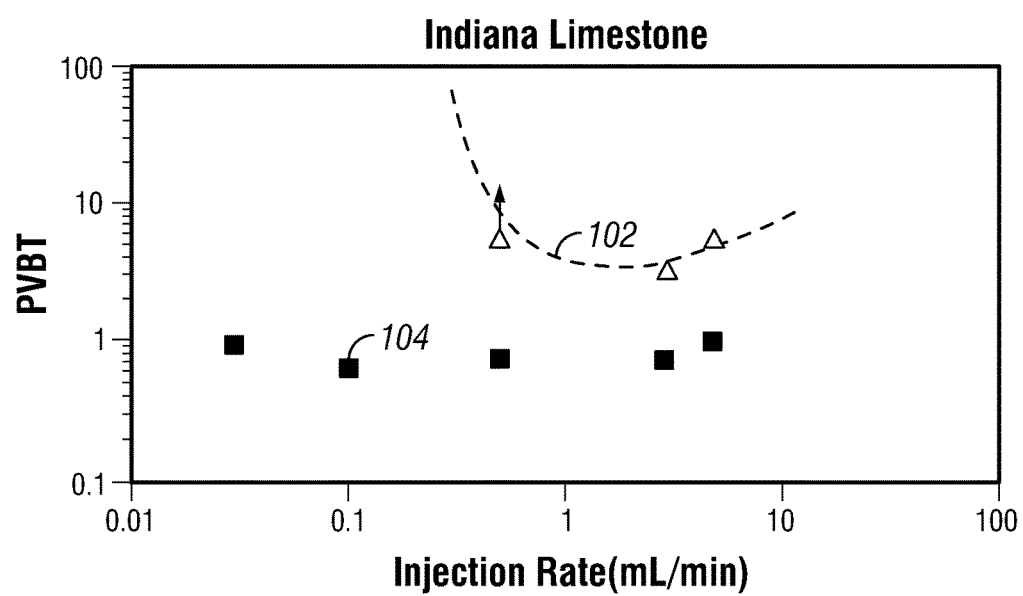

AQUEOUS SOLUTION AND METHOD FOR USE THEREOF

RELATED APPLICATION DATA

None.

BACKGROUND

The statements in this section merely provide background information related to the present disclosure and may not constitute prior art.

The technical field generally, but not exclusively, relates to high concentration of hydrochloric acid (HCl) solutions and uses thereof. Previously known HCl solutions can be made at atmospheric pressure up to about 37% HCl by weight. Attempting to put more HCl into the solution results in the HCl leaving the solution as HCl gas. Additionally, even more modest concentrations of HCl (e.g. 15% or 28%) evolve highly irritating fumes and are difficult to handle.

SUMMARY

Embodiments pertain to aqueous solutions having a concentration of HCl exceeding 37% by weight. Other embodiments include methods to use and handle HCl solutions. This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

FIG. 1 depicts illustrative data showing comparative PVBT data between an HCl solution with and without a Fixing Agent.

DETAILED DESCRIPTION OF SOME ILLUSTRATIVE EMBODIMENTS

For the purposes of promoting an understanding of the principles of the disclosure, reference will now be made to the embodiments illustrated in the drawings and specific language will be used to describe the same. It will nevertheless be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the compositions used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that the Applicant appreciates and understands that any and all data points within the range are to be considered to have been specified, and that the Applicant possessed knowledge of the entire range and all points within the range.

The term "high surface area particles" as utilized herein should be understood broadly. In certain embodiments, a high surface area particle is a particle having a complex or porous surface which provides a greater surface area than a simple geometrical particle. An example high surface particle is a porous particle, a metal organic framework, a particle having greater than 100 $m^2/g$, greater than 500 $m^2/g$, greater than 1000 $m^2/g$, and/or greater than 10,000 $m^2/g$. Zeolites, clays, and/or materials suited for catalytic reactions can also be formulated to be high surface area particles.

The term "a substantially atmospheric pressure" as utilized herein should be understood broadly. In certain embodiments, a substantially atmospheric pressure is a pressure observable at ambient conditions. Example pressures that are substantially atmospheric further include pressures occurring at altitude, slight positive pressures provided to a building, laboratory, and/or other environment, a vapor pressure in a vessel having a lid weight or other incidentally pressurizing aspect where pressure sealing is not the primary purpose. In certain embodiments, any pressure equal to or less than sea level atmospheric pressure, and/or any pressure not exceeding sea level pressure by more than an incidental amount (e.g. 1 psia or 2 psia) may be a substantially atmospheric pressure.

The term "vapor space communication" as utilized herein should be understood broadly. An example vapor space communication with a fluid includes any position wherein vapors emanating from an amount of fluid would significantly pass through the position. Another example includes any area vertically above the fluid, an area adjacent to an open container of the fluid, an area wherein a ullage of the fluid vents to the area, an area fluidly coupled to the fluid or the ullage of the fluid, and/or an area vertically above the ullage. An area in the ullage, and/or an area in vapor space communication with a fluid remnant in a vessel are also in vapor space communication with the fluid. The term "vapor space communication" references the position of the area with the fluid, and does not require that the fluid actually provide vapors to the area. In certain embodiments, vapor space communication with a fluid references any area where an operator working with the fluid containing HCl, and/or would be required to operate with personal protection equipment (PPE), if the fluid were uninhibited and/or unretarded 36% HCl (by weight). Specific and non-limiting examples include a truck walkway adjacent to an access lid to a fluid tank on the truck, the top of a fluid tank accessible to a lid on the fluid tank, the area adjacent to a chemical tote having an opening top, the area surrounding a mixing vessel wherein the HCl fluid passes through the mixing vessel (e.g. on a blender or a cementing truck), and/or a bulk supply facility where bulk fluids are loaded or transferred into fluid carrying trucks, chemical totes, and/or rail cars.

The term "urea derivative" as used herein should be understood broadly. An example urea derivative includes any urea compound having at least one of the four nitrogen bonded hydrogens substituted. The substitution products may be anything, but include at least any hydrocarbon group, and may include substitutions on one or both of the urea nitrogens. Additionally or alternatively, substitutions may include cyclic groups (e.g. ethylene urea), aromatic groups, and/or nitrogen containing hydrocarbon groups. The inclusion of a urea derivative in the present disclosure should not be read as limiting to other urea derivatives which may be used as an alternative or addition.

An example aqueous solution includes HCl in a weight fraction exceeding 37%. The aqueous solution includes a fixing agent (FA) that allows the HCl fraction to exceed the 37% normally understood to be the limit of HCl solubility at atmospheric pressure. Above 37%, normally, the evolution of HCl gas from the solution prevents the HCl fraction from getting any higher. In certain embodiments, the HCl weight fraction of the aqueous solution may be as high as 45.7%. In certain embodiments, the FA is selected to be 1,3-dimethyl urea and/or ethylene urea, and the HCl weight fraction of the aqueous solution is present at up to 41.1%.

The FA includes one or more of urea and a urea derivative. The FA is provided in a molar ratio of FA:HCl between 0.25 and 2.0. In certain embodiments, the molar ratio of FA:HCl is provided between 1.0 and 2.0. In certain further embodiments, the molar ratio of FA:HCl is provided to be about 1.7. The selection of a molar ratio of FA:HCl depends upon the specific embodiment, and is a mechanical step for one of skill in the art having the benefit of the disclosures herein. It will be understood that an upper limit of FA is present as the solubility of the FA and HCl in the aqueous solution is reached, and that higher molecular weight FA materials will provide lower molar ratios of FA:HCl at the highest HCl concentrations. In certain embodiments, the FA is selected having a molecular weight below 100 g/mol. Additionally or alternatively, the FA may have a molecular weight below 120 g/mol, below 150 g/mol, below 175 g/mol, or greater than these values.

The aqueous solution includes HCl and the FA both in solution. However, the FA and HCl may be added in any order, at least partially. For example, the FA may be dissolved in water, and then the HCl added by any method, such as bubbling HCl gas therethrough. In another example, the HCl is added, at least partially, first and then the FA is added thereafter, with the remaining HCl added with and/or after the FA. In another example, the FA is provided fully or partially as an undissolved solid which dissolves into the aqueous solution as the HCl is added. In certain embodiments, the amount of water present in the aqueous solution is between 0.3 and 1.3 times the amount of the FA, inclusive, by mass.

In certain embodiments, the aqueous solution has a fluid density exceeding 1.2 g/mL. It is noted that conventional 36% HCl at atmospheric pressure has a fluid density of about 1.18 g/mL. In certain embodiments, the fluid density of the aqueous solution may be less than 1.2 g/mL. Fluid densities of various aqueous solutions are depicted in Table 1, although the fluid densities in Table 1 are non-limiting examples.

First example aqueous solutions. A first example set of solutions was prepared in a 250 mL conic flask containing 23 g NaCl powder, with 11 mL 98% $H_2SO_4$ added to the container but physically separated from the NaCl. The vessel was tightly sealed with a 0.25" i.d. tubing connected to the bottom of a tube containing 3 mL $H_2O$. Then 3.0 g urea powder was added to the tube. One example solution added 1.0 g of metal-organic framework (MOF) material to the tube, while another example solution did not add the MOF material to the tube. The conic flask was agitated, resulting in controlled mixing of the NaCl and $H_2SO_4$, leading to instant generation of nearly 100%, dry HCl gas which was in turn bubbled at a moderate rate through the $H_2O$ solution in the tube. This process led to the dissolution of urea beyond its normal solubility in water. Without being limited to a theory of operation, it is believed that the adduction between HCl and urea via hydrogen bonding allowed for dissolution of urea beyond the normal solubility limit. At the end of the process, 1.0 mL of the HCl containing solution was weighed to measure its density. In addition, the solution was titrated against 15% NaOH solution in the presence of a droplet phenolsulfonphthalein dye, from which the effective concentration of HCl was determined.

Second example aqueous solution. A second example solution was prepared in a 250 mL conic flask containing 23 g NaCl powder, with 11 mL 98% $H_2SO_4$ added to the container but physically separated from the NaCl. The vessel was tightly sealed with a 0.25" i.d. tubing connected to the bottom of a tube containing 3 ml $H_2O$. Then 4.5 g of 1,3-dimethyl urea was added to the tube. The conic flask was agitated, resulting in controlled mixing of the NaCl and $H_2SO_4$, leading to instant generation of nearly 100%, dry HCl gas which was in turn bubbled at a moderate rate through the $H_2O$ solution in the tube. This process led to the dissolution of 1,3-dimethyl urea beyond its normal solubility in water. At the end of the process, 1.0 mL of the HCl containing solution was weighted to measure its density. In addition, the solution was titrated against 15% NaOH solution in the presence of a droplet phenolsulfonphthalein dye, from which the effective concentration of HCl was determined.

Referencing Table 1, a number of experimental solutions are depicted. Each of the solutions depicted were created in a manner consistent with or similar to that described for the first example set of solutions and the second example solution described preceding.

TABLE 1

Example aqueous solutions

| FA | Beginning solution | Add'l. solid FA | Effective HCl (wt %) | Density (g/mL) |
|---|---|---|---|---|
| Urea | 3 mL $H_2O$ | 2.4 g | 41.51 | 1.24 |
| Urea | 3 mL $H_2O$ and 3 g urea | N/A | 43.05 | 1.22 |
| Urea | 3 mL $H_2O$ | 3 g | 44.82 | 1.29 |
| Urea | 3 mL $H_2O$ and 3 g urea | N/A | 43.91 | 1.27 |
| Urea | 3 mL $H_2O$ and 1 g MOF | 3 g | 45.72 | 1.45 |
| Urea | 3 mL $H_2O$ | 3.6 g | 43.72 | 1.29 |
| Urea | 3 mL $H_2O$ and 3 g urea | 6 g | 42.05 | 1.26 |
| 1,3-Dimethyl urea | 3 mL $H_2O$ | 4.5 g | 41.15 | 1.18 |
| Ethylene urea | 3 mL $H_2O$ | 4.5 g | 41.15 | 1.26 |

It can be seen from Table 1 that a number of solutions having a FA and HCl were developed that have greater than 37% HCl by weight. The solutions were created by providing an initial aqueous solution, and dissolving HCl gas into the solution. In certain formulations, urea was present in the initial solution and/or added and dissolved with the HCl dissolving process. The formulations in Table 1 have higher HCl concentrations than previously known aqueous HCl formulations at ambient conditions. The fifth solution was formulated with metal organic framework (MOF) particles in the solution. The MOF particles may be removed after the HCl dissolution, or they may be left in the solution.

Without limiting the disclosure to a particular theory of operation, it is believed that the FA complexes with the HCl molecules to keep them in solution at higher concentrations than previously known. In certain embodiments, the FA includes a primary amine in the molecule (e.g. as in urea), and in certain embodiments, the FA includes a secondary nitrogen in the molecule (e.g. as in 1,3-dimethyl urea). Without limiting the disclosure to a particular theory of operation, it is believed the MOF particles, or other high surface area particles, temporarily store enough of the HCl bubbling through the solution to provide time for the FA to complex with the HCl molecules and keep them in solution at higher concentrations than previously attainable.

Subjectively, the formulated solution exhibits a very low fume profile, and is not irritating to an operator in the presence of the solution vapor. This contrasts sharply with standard HCl solutions, which are irritating even at low concentrations, and which are significantly more irritating and/or hazardous at higher concentrations. Without being limited to a theory of operation, it is believed that the lower fume profile is due to the greatly reduced vapor pressure of the HCl when complexed with the FA.

An HCl solution in the 40-45% by weight concentration range, according to the *Gmelin Handbook of Inorganic and Organometallic Chemistry*, 1968, System Number 6 chlorine, Supplement Part B—Supply 1, should exhibit a freezing point of between −25° C. and −28° C. It is noted that the solutions in the *Gmelin Handbook* were under pressure. The solutions from the first example set of aqueous solutions and from the second example aqueous solution preceding were placed in a freezer at −40° C. and remained in a single phase for an extended period of time. Without being limited to a particular theory of operation, it is believed the molecular interactions between the HCl and the FA effectively lower the freezing point of the aqueous solution.

The formulations and data in Table 1 illustrate certain principles of the present disclosure. However, a given embodiment of the present disclosure may have a formulation different than those presented in Table 1, and certain embodiments of the present disclosure may not include a formula presented in Table 1. An aqueous solution may include one or more fixing agents, including a mixture of fixing agents. Where more than one FA is present in the aqueous solution, the molar ratio between the FA:HCl may be evaluated from the total sum of the fixing agents present in the solution.

In certain embodiments, the aqueous solution includes an amount of hydrofluoric acid (HF). HF exhibits distinct reactions from HCl, and is useful in certain applications to enhance the activity of the resulting aqueous solution. For example, HF is utilized in the cleanup of sandstone formations where HCl alone is not effective for removing certain types of formation damage. It is believed that the present aqueous solution will complex with HF similarly to the observed effects with HCl. Accordingly, solutions can be formulated with a total acid amount that is much higher than presently attainable formulations. In certain embodiments, the HF is present in an amount of at least 0.25% by weight. The HF may be present in an amount of up to 2%, up to 6%, up to 10%, or greater amounts. The HF may be present in addition to the amount of HCl, and/or as a substitution for an amount of the HCl.

Referencing Table 2, the observed retardation factors for a number of aqueous solutions with HCl and a FA are presented therein. Retardation factor indicates the time it took to retarded HCl of equal effective concentration to consume in the presence of certain limestone sample, compared to the case of straight HCl. It is noted that the HCl amounts were between 15% and 28% by weight. However, comparative data above 37% was not possible as such formulations have not been previously attained and a straight acid above 37% was not possible. Nevertheless, it is believed that the retardation effect of the FA observed in the formulations of Table 2 is relevant to formulations having greater than 37% HCl. The retardation factors in Table 2 were determined from reaction rates with a carbonate at 68° F. (20° C.). Where a very large retardation factor is shown (HIGH), that merely indicates that no observable (by sample weight) reaction had occurred in the time frame of the test. However, the retarded acid in the samples having a (HIGH) showed indicia of reaction, such as by bubble formulation on the surface of the carbonate sample utilized, and the acid therein was active and unspent.

TABLE 2

Observed retardation factors with certain Fixing Agents

| FA | Mol. Wt. | Structure | Effective HCl % | Retardation factor |
|---|---|---|---|---|
| Urea | 60 | $H_2N-C(=O)-NH_2$ | 17<br>23<br>28 | 14<br>16<br>16 |
| 1,1-dimethyl urea | 88 | $H_3C-N(CH_3)-C(=O)-NH_2$ | 15<br>21<br>28 | 9<br>6<br>3 |

TABLE 2-continued

Observed retardation factors with certain Fixing Agents

| FA | Mol. Wt. | Structure | Effective HCl % | Retardation factor |
|---|---|---|---|---|
| 1,3-dimethyl urea | 88 | H₃C-NH-C(=O)-NH-CH₃ | 15<br>21<br>28 | 15<br>13<br>18 |
| 1,1-diethyl urea | 116 | H₂N-C(=O)-N(CH₃)(CH₂CH₃) (1,1-diethyl urea structure) | 17<br>23<br>27 | 20<br>18<br>12 |
| 1,3-diethyl urea | 116 | H₃C-CH₂-NH-C(=O)-NH-CH₂-CH₃ | 15<br>21<br>28 | HIGH<br>HIGH<br>HIGH |
| 1,3-diallyl urea | 140 | H₂C=CH-CH₂-NH-C(=O)-NH-CH₂-CH=CH₂ | 15<br>21<br>28 | HIGH<br>HIGH<br>HIGH |
| 1,3-dipropyl urea | 144 | H₃C-CH₂-CH₂-NH-C(=O)-NH-CH₂-CH₂-CH₃ | 15<br>21<br>28 | HIGH<br>HIGH<br>HIGH |
| 1,3-dibutyl urea | 172 | Me-(CH₂)₃-NH-C(=O)-NH-(CH₂)₃-Me | 15<br>21<br>28 | HIGH<br>HIGH<br>33 |
| 1,1,3,3-tetra urea | 116 | (H₃C)(H₃C)N-C(=O)-N(CH₃)(CH₃) | 15<br>21<br>28 | 33<br>15<br>10 |
| 1,1,3,3-tetra urea | 172 | (H₃C-CH₂)(H₃C-CH₂)N-C(=O)-N(CH₂-CH₃)(CH₂-CH₃) | 15<br>21<br>28 | 20<br>13<br>8 |
| 2-aminoethyl urea | 113 | H₂N-C(=O)-NH-CH₂-CH₂-NH₂ | 15<br>21<br>28 | HIGH<br>HIGH<br>HIGH |

As can be seen in Table 2, a variety of FA and HCl concentrations provide for significant retardation of the HCl activity over HCl without a FA present. It is believed that the retardation of HCl activity continues for concentrations of HCl exceeding 37%, although comparative data is not possible as discussed preceding. In certain embodiments, the retardation is sufficient that usage and handling of the aqueous solution can be performed without additional acid retarders present in the aqueous solution. This can achieve cost savings and environmental improvements relative to acid retarders that may not be as easy to handle and dispose of as urea and urea derivatives. The addition of enough of any material will dilute the acid to a lower concentration and thereby reduce the acid activity. An acid retarder, as used herein, includes any material that reduces acid activity through a mechanism other than mere dilution. Non-limiting examples include chelating ligand based retarders, acid internal phase emulsions, and/or surfactant based retarders.

Referencing FIG. 1, data is depicted for an aqueous solution having HCl and a FA relative to an identical HCl solution having chelating ligand based retarder typical of what is used in presently known systems. The data of FIG. 1 indicates the pore-volume to breakthrough (PVBT) for two fluids at various pumping rates, which is the number of pore volumes of solution that are pumped into a core before breakthrough is observed on the opposite end of the core.

Some indication of retarded acid reaction rates can be shown where a lower pumping rate provides for the lowest PVBT. It can be seen that the aqueous solution having HCl and a FA (square points 104) displayed significantly retarded reaction rates relative to the typically retarded acid system (triangle points 102) at the temperature (300° C.) and HCl concentration of the test. The concentration of HCl in the data taken for FIG. 1 was 15% by weight, lower than an amount exceeding 37% by weight, however it is believed that acid retardation would be exhibited above 37% as well. Comparative data above 37% is not possible, as discussed earlier.

The schematic flow descriptions which follow provide illustrative embodiments of performing procedures for creating an aqueous solution having more than 37% by weight HCl, and for handling an HCl solution having deactivated fumes. Operations illustrated are understood to be examples only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An example procedure includes combining an amount of water with a fixing agent (FA), where the amount of water is present in an amount between 0.3 and 1.3 times the mass of the FA. The procedure further includes dissolving an amount of HCl into the combined amount of water and FA. The dissolving of the HCl may occur after dissolving of the FA, simultaneous with the dissolving of the FA, or at least partially before the dissolving of the FA. The amount of HCl gas is in a molar ratio of between 4.0 and 0.5 times the amount of the FA. The total amount of HCl gas dissolved into the aqueous solution is greater than 37% by weight.

In a further example, the procedure includes dissolution of at least a portion of the FA in the water during the dissolution of the HCl in the combined water and FA. Example operations include beginning the dissolution of the HCl and adding the FA as a solid or a solution, providing some of the FA in solution with the water and some of the FA as a solid, and/or providing the FA as a solid in the water and dissolving the HCl into the water while dissolving the FA.

An example procedure includes adding a second FA, where the second FA includes an amount of high surface area particles. An example high surface area particle includes a metal organic framework, but may include any high surface area particle including a porous particle. The second FA may remain in the solution after the dissolving the HCl, or may be removed completely or partially from the solution after that dissolving the HCl. The amount of the second FA added may be in any amount, but an example non-limiting amount includes between 5% and 50% of the amount of water by weight.

Another example procedure includes providing an aqueous solution having an amount of HCl exceeding 37% by weight. The procedure further includes an operation to suppress gaseous HCl fumes from the aqueous solution. The operation to suppress the gaseous HCl fumes includes an operation to add an HCl fixing agent (FA) to the solution, where the amount of FA includes a molar ratio of FA:HCl of between 0.25 and 2.0 inclusive. The FA includes urea and/or a urea derivative. The operation to add the fixing agent may be performed before, simultaneously, and/or partially after the addition of the HCl into the solution.

An example procedure further includes an operation to transport the HCl solution over a public road and/or a railway. In certain embodiments, the operation to transport the HCl solution includes placing the HCl solution into an atmospherically pressured vessel, and/or a standard fluid vessel which does not provide for a pressurized environment. Another example procedure includes transporting the HCl solution having over 37% HCl by weight to a location, and diluting the HCl solution to a desired HCl concentration after the transporting. Example dilution concentrations include, without limitation, diluting the solution to 7.5% HCl, to 15% HCl, and/or to 28% HCl by weight. Any other concentrations are also contemplated herein. The transport and dilution allows for reduced transport costs and risk (e.g. fewer transport vessels) while providing the desired total amount of HCl at the usage location.

An example procedure further includes residing the HCl solution in an atmospheric pressure vessel for a time period, which may be a period of at least an hour. The operation to reside the HCl solution in an atmospheric pressure vessel includes residing the solution without adding an additional acid retarder to the HCl solution. Any acid retarder is contemplated herein, and the exclusion of other acid retarders in certain embodiments is optional.

An example procedure includes positioning the HCl solution in an atmospheric pressure vessel at a location having an ambient temperature lower than −28° C., and residing the HCl solution in the vessel for a period of time exceeding either a cold soak time or a time period until a temperature of at least a part of the HCl solution is below −28° C. An atmospheric pressure vessel is a broad concept, and includes any equipment or device having an amount of fluid therein, where the HCl solution in normal use can reside for a time period exceeding either a cold soak time or a time period until a temperature of at least a part of the HCl solution is below −28° C. Example and non-limiting examples of an atmospheric pressure vessel include a fluid tank, a chemical tote, a rail car, a liquid transport, and/or a pipe or fluid line. Examples of a pipe or fluid line as an atmospheric pressure vessel include a pipe or fluid line that exposes the fluid therein to temperatures sufficient to provide a heat transfer environment wherein the fluid reaches a cold soak temperature and/or at least a part of the fluid reaches a temperature below −28° C. Without limiting to a particular operating condition, the combination of fluid flow rate, vessel heat transfer environment, sufficiently low ambient temperature, and/or stagnant fluid periods can combine in any manner to provide the heat transfer environment wherein the fluid reaches a cold soak temperature and/or at least a part of the fluid reaches a temperature below −28° C.

A cold soak period is an extended period of time until either a significant portion of the HCl solution and vessel is near the ambient temperature, or until the temperature of the HCl solution and vessel is at a steady state temperature. For various reasons, the steady state temperature of the HCl solution and the vessel may not be identical to the ambient temperature. Further, the temperature of the HCl solution in the vessel may not be uniform. However, any period of time wherein a portion of the HCl solution in the vessel is below −28° C. is a sufficient residence time. The residence time at temperatures well below −28° C. can be shorter. One of skill in the art, having the benefit of the disclosures herein and information typically known about a particular location—such as but not limited to the ambient temperature, ambient wind conditions, vessel configuration (volume, geometry, insulation), and starting temperature of the HCl solution—can readily determine a residence time wherein a portion of the HCl solution is expected to fall below −28° C. The freezing point of the HCl solutions such as those formulated in the first set of example solutions and the second example solution is believed to be below −40° C.

Another example procedure includes positioning an operator into a vapor space communication with the HCl solution, and performing a fluid utility operation after the positioning. Example and non-limiting fluid utility operations that may put an operator into a vapor space communication with the HCl solution include checking a fluid level of the HCl solution (e.g. a visual depth check, and/or a fluid depth check with a device); performing a fluid test on the HCl solution (e.g. fluid property test, pH reading, taking a fluid sample for testing); adding an amount of an additive to the aqueous solution (e.g. adding the additive through an opening into a fluid tank or chemical tote); closing a lid on an atmospheric pressure vessel holding the HCl solution; transferring at least a portion of the HCl solution out of an atmospheric pressure vessel holding the HCl solution (e.g. transferring between tanks or totes, moving at a bulk facility, transferring into a treatment fluid); performing a visual check on the HCl solution; operationally coupling a fluid transfer device to one of the HCl solution and/or an atmospheric pressure vessel holding the HCl solution (e.g. connecting a fluid transfer line, inserting a transfer line into the top of a vessel); and/or agitating the HCl solution (e.g. with a stirrer, gaseous agitation, and/or recirculating the fluid).

As is evident from the figures and text presented above, a variety of embodiments according to the present disclosure are contemplated.

While the disclosure has provided specific and detailed descriptions to various embodiments, the same is to be considered as illustrative and not restrictive in character. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

Moreover, in reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. It is the express intention of the applicant not to invoke 35 U.S.C. §112, paragraph 6 for any limitations of any of the claims herein, except for those in which the claim expressly uses the words 'means for' together with an associated function.

We claim:

1. A method, comprising:
    combining an amount of water, an HCl fixing agent (FA), and a second FA, wherein the amount of water is present in an amount between 0.3 and 1.3 times the mass of the FA, inclusive, wherein the FA comprises at least one of urea and a urea derivative, and wherein the second FA comprising an amount of high surface area particles;
    dissolving an amount of HCl gas into the combined amount of water, FA and second FA to form an aqueous solution, wherein the second FA temporarily stores at least a portion of the HCl gas to provide time for the FA to complex with the HCl molecules, wherein the amount of HCl dissolved in the aqueous solution comprises a molar ratio of HCl:FA of between 4.0 and 0.5, inclusive, and wherein the amount of HCl comprises greater than 37% by weight of the aqueous solution, based on the total weight of the aqueous solution.

2. The method of claim 1, further comprising dissolving at least a portion of the FA in the amount of water during the dissolving the amount of HCl into the combined amount of water and FA.

3. A method, comprising:
    combining an amount of water, an HCl fixing agent (FA), and a second FA, wherein the amount of water is present in an amount between 0.3 and 1.3 times the mass of the FA, inclusive, wherein the FA comprises at least one of urea and a urea derivative, and wherein the second FA comprising an amount of high surface area particles;
    dissolving an amount of HCl gas into the combined amount of water, FA and second FA to form an aqueous solution, wherein the amount of HCl dissolved in the aqueous solution comprises a molar ratio of HCl:FA of between 4.0 and 0.5, inclusive; and
    removing the second FA from the aqueous solution after the dissolving the HCl, wherein the amount of HCl after the removal of the second FA comprises greater than 37% by weight of the aqueous solution, based on the total weight of the aqueous solution.

4. The method of claim 1, wherein the amount of high surface area particles comprises an amount of a metal-organic framework material.

* * * * *